United States Patent
He et al.

(10) Patent No.: US 10,833,714 B2
(45) Date of Patent: Nov. 10, 2020

(54) MULTI-CARD USER EQUIPMENT AND SERVICE PROCESSING METHOD THEREOF

(71) Applicant: SPREADTRUM COMMUNICATIONS (SHANGHAI) CO., LTD., Shanghai (CN)

(72) Inventors: Yi He, Shanghai (CN); Xianliang Chen, Shanghai (CN); Xichun Gao, Shanghai (CN); Jinjin Ni, Shanghai (CN); Yiguo Zhao, Shanghai (CN); Yutai Hao, Shanghai (CN); Jin Xu, Shanghai (CN); Chen Tang, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 15/804,494

(22) Filed: Nov. 6, 2017

(65) Prior Publication Data
US 2018/0131402 A1 May 10, 2018

(30) Foreign Application Priority Data
Nov. 8, 2016 (CN) .......................... 2016 1 0981611

(51) Int. Cl.
*H04B 1/38* (2015.01)
*H04B 1/3816* (2015.01)
(Continued)

(52) U.S. Cl.
CPC .......... *H04B 1/3816* (2013.01); *H04W 8/183* (2013.01); *H04W 88/06* (2013.01); *H04W 88/08* (2013.01)

(58) Field of Classification Search
CPC .... H04B 1/3816; H04W 8/183; H04W 88/06; H04W 88/08
(Continued)

(56) References Cited

U.S. PATENT DOCUMENTS

| | | | | |
|---|---|---|---|---|
| 8,204,502 B2 * | 6/2012 | Khetawat | ................ | H04W 8/04 455/436 |
| 8,483,759 B2 * | 7/2013 | Shi | ........................ | H04W 76/11 455/558 |

(Continued)

FOREIGN PATENT DOCUMENTS

| | | | |
|---|---|---|---|
| CN | 101217746 A | | 7/2008 |
| CN | 101795331 A | | 8/2010 |

(Continued)

OTHER PUBLICATIONS

USPTO Non-Final Office Action corresponding to U.S. Appl. No. 15/804,524; dated Jun. 1, 2018.
(Continued)

*Primary Examiner* — April G Gonzales
(74) *Attorney, Agent, or Firm* — Cantor Colburn LLP

(57) ABSTRACT

A multi-card user equipment and a method for processing its service are provided. The method includes, when receiving service request corresponding to a first subscriber identity card, implementing data transmission channel between user equipments and a network which is corresponding to the first subscriber identity card to process the service request; the data transmission channel corresponding to at least two of the subscriber identity cards shares a common wireless connection. With the method, providing services for multiple cards at the same time can be available, meanwhile hardware cost and complexity is decreased, and wireless transmission resources is saved.

16 Claims, 4 Drawing Sheets

(51) Int. Cl.
*H04W 8/18* (2009.01)
*H04W 88/08* (2009.01)
*H04W 88/06* (2009.01)

(58) Field of Classification Search
USPC .......................................................... 455/558
See application file for complete search history.

(56) References Cited

U.S. PATENT DOCUMENTS

| | | | | |
|---|---|---|---|---|
| 8,532,707 | B2* | 9/2013 | Kim | H04M 1/72597 |
| | | | | 455/432.3 |
| 9,113,450 | B2* | 8/2015 | Pelletier | H04W 72/1263 |
| 9,635,532 | B2* | 4/2017 | Haessler | H04W 4/90 |
| 2002/0154632 | A1* | 10/2002 | Wang | H04W 48/18 |
| | | | | 370/389 |
| 2004/0229601 | A1* | 11/2004 | Zabawskyj | H04W 76/15 |
| | | | | 455/417 |
| 2007/0165646 | A1* | 7/2007 | He | H04L 12/4641 |
| | | | | 370/395.4 |
| 2009/0100147 | A1* | 4/2009 | Igarashi | H04N 21/6408 |
| | | | | 709/218 |
| 2009/0180451 | A1* | 7/2009 | Alpert | H04W 72/1215 |
| | | | | 370/338 |
| 2010/0027467 | A1* | 2/2010 | Wu | H04W 48/18 |
| | | | | 370/328 |
| 2010/0105433 | A1* | 4/2010 | Lin | H04W 92/08 |
| | | | | 455/558 |
| 2011/0051685 | A1* | 3/2011 | Saitou | H04W 36/02 |
| | | | | 370/331 |
| 2012/0115493 | A1* | 5/2012 | Matada | H04W 72/048 |
| | | | | 455/450 |
| 2012/0135715 | A1* | 5/2012 | Kang | H04W 8/183 |
| | | | | 455/412.1 |
| 2012/0142348 | A1* | 6/2012 | Park | H04W 52/0209 |
| | | | | 455/435.1 |
| 2013/0316766 | A1* | 11/2013 | Nousiainen | H04B 1/401 |
| | | | | 455/558 |
| 2014/0094140 | A1* | 4/2014 | Misra | H04L 41/50 |
| | | | | 455/407 |
| 2014/0199961 | A1* | 7/2014 | Mohammed | H04W 4/50 |
| | | | | 455/406 |
| 2014/0351832 | A1* | 11/2014 | Cho | H04L 65/1066 |
| | | | | 719/328 |
| 2015/0139181 | A1* | 5/2015 | Cheng | H04W 36/14 |
| | | | | 370/331 |
| 2015/0171909 | A1* | 6/2015 | Gao | H04B 1/3816 |
| | | | | 455/558 |
| 2015/0245309 | A1* | 8/2015 | Nayak | H04W 8/183 |
| | | | | 455/435.3 |
| 2015/0282013 | A1* | 10/2015 | Kim | H04W 24/10 |
| | | | | 370/331 |
| 2015/0327207 | A1* | 11/2015 | Bharadwaj | H04W 8/04 |
| | | | | 455/435.2 |
| 2016/0014579 | A1* | 1/2016 | Kasilya Sudarsan | H04W 4/16 |
| | | | | 455/417 |
| 2016/0029274 | A1* | 1/2016 | Ng | H04W 84/12 |
| | | | | 455/437 |
| 2016/0105901 | A1* | 4/2016 | Lu | H04L 65/1069 |
| | | | | 370/329 |
| 2016/0183238 | A1* | 6/2016 | Buthler | H04W 72/0446 |
| | | | | 370/329 |
| 2016/0278128 | A1* | 9/2016 | Krishnamurthy | H04W 74/085 |
| 2016/0381710 | A1* | 12/2016 | Bansal | H04W 74/0833 |
| | | | | 370/336 |
| 2017/0105193 | A1 | 4/2017 | Liu et al. | |
| 2017/0118255 | A1* | 4/2017 | Tsai | H04W 12/0013 |
| 2018/0063881 | A1* | 3/2018 | Shah | H04W 76/19 |
| 2018/0131402 | A1 | 5/2018 | He et al. | |
| 2018/0132097 | A1 | 5/2018 | Ni et al. | |

FOREIGN PATENT DOCUMENTS

| | | |
|---|---|---|
| CN | 101951653 A | 1/2011 |
| CN | 103281797 A | 9/2013 |
| CN | 104717720 A | 6/2015 |
| CN | 105722060 A | 6/2016 |
| CN | 105722140 A | 6/2016 |

OTHER PUBLICATIONS

USPTO Non-Final Office Action corresponding to U.S. Appl. No. 15/810,734; dated Mar. 4, 2019.
SIPO First Office Action corresponding to Application No. 201610981611.8; dated Oct. 8, 2019.
SIPO First Office Action corresponding to Application No. 201611003401.8; dated Sep. 27, 2019.
SIPO Second Office Action corresponding to CN Application No. 201610981611.8 dated Feb. 3, 2020, with English translation.
USPTO Non-Final Office Action corresponding to U.S. Appl. No. 15/810,734; dated Jan. 16, 2020.

\* cited by examiner

MULTI-CARD USER EQUIPMENT AND SERVICE PROCESSING METHOD THEREOF

CROSS-REFERENCE TO RELATED APPLICATIONS

This invention claims the benefit of priority to Chinese Patent Application No. 201610981611.8, filed Nov. 8, 2016, the entire disclosure of which are incorporated herein by reference.

TECHNICAL FIELD

The present disclosure generally relates to communication field, and more particularly, to a multi-card user equipment, and service processing method thereof.

BACKGROUND

With many mobile network protocols having been commercialized, it's a common that one cell is covered with multiple network signals, where different Mobile Network Operators compete fiercely, but brings more choices for users.

In order to facilitate users to choose mobile network according to their own needs, most user equipments have multiple subscriber identity card functions.

Currently, most Multi-subscriber identity card user equipments can only provide service for one subscriber identity card at one moment. In other words, the existing multi-card user equipments can't provide services for multiple subscriber identity cards at a same time, which does not meet the service need of users.

In order to meet the users' service need, a user equipment which can provide services for multiple subscriber identity cards at a same time emerges. However, the hardware cost and complexity of this kind of user equipment is high, and it also occupies too much wireless transmission resources.

SUMMARY

Embodiments of the present disclosure provides a method for providing services for multiple cards at the same time, meanwhile decreasing hardware cost and complexity, and saving wireless transmission resources.

In an embodiment, a multi-card user equipment service processing method is provided, including: when receiving the service request corresponding to the first subscriber identity card, implementing a data transmission channel between the user equipment and a network corresponding to a first subscriber identity card to process a service request; wherein the data transmission channel includes a data channel and a wireless connection, the data channel corresponds to multiple subscriber identity cards included in the user equipment one by one, and a data transmission channel corresponding to at least two of the subscriber identity cards share a common wireless connection.

Optionally, all the data transmission channels corresponding to the multiple subscriber identity cards may share a common wireless connection.

Optionally, the data transmission channel sharing a common wireless connection may be established based on a common subscriber identity service access point.

Optionally, the service may include a basic service and a supplementary service; the basic service may include any one of registration service, voice service, video service, short message service or data service; and the supplementary service includes services relevant to supplementing or modifying the basic service.

Optionally, the subscriber identity card establishing a data transmission channel between the first subscriber identity card and the network may be a subscriber identity card registered in a LTE network, when the service request is a VoLTE service request.

Optionally, the subscriber identity card establishing a data transmission channel between the first subscriber identity card and the network may be a subscriber identity card registered in a Wi-Fi network, when the service request is a VoWiFi service request.

Optionally, the service request may be initiated based on the first subscriber identity card, or by the network.

Optionally, the multi-card user equipment may be in a idle state or a service processing state, when receiving the service request corresponding to the first subscriber identity card.

In an embodiments, a multi-card user equipment is provided, including:
multiple subscriber identity cards including a first subscriber identity card; a data transmission channel establishment circuitry; and a service processing circuitry; wherein the first subscriber identity card is an user identification card corresponding to a service request; wherein the data transmission channel establishment circuitry, is configured to: establish a data transmission channel between the user equipment and a network, wherein the data transmission channel includes a data channel and a wireless connection, the data channel corresponds to the multiple subscriber identity cards one by one, and a data transmission channel corresponding to at least two of the subscriber identity cards share a common wireless connection; and wherein the service processing circuitry, is configured to: when receiving a service request corresponding to the first subscriber identity card, implement a data transmission channel between the user equipment and the network corresponding to the first subscriber identity card to process the service request.

Optionally, all the data transmission channels correspond to the multi-cards may share a common wireless connection.

Optionally, the data transmission channel sharing a common wireless connection may be established based on a common subscriber identity service access point.

Optionally, the service may include: a basic service and a supplementary service the basic service may include any one of registration service, voice service, video service, short message service or data service; the supplementary service includes services relevant to supplementing or modifying the basic service.

Optionally, when the service request may be a VoLTE service request, the subscriber identity card establishing data transmission channel between the first subscriber identity card and the network is a subscriber identity card registered in a LTE network.

Optionally, when the service request may be a VoWiFi service request, the subscriber identity card establishing data transmission channel between the first subscriber identity card and the network may be a subscriber identity card registered in a Wi-Fi network.

Optionally, the service request may be initiated based on the first subscriber identity card, or by the network.

Optionally, when receiving the service request corresponding to the first subscriber identity card, the multi-card user equipment may be in idle state or service processing state.

Compared with existing technology, embodiments of the present disclosure may provide following advantages:

Data transmission channels corresponding to at least two of the subscriber identity cards share a common wireless connection, compared with the solution of multiple subscriber identity cards corresponding to different wireless connection, hardware cost and complexity can be decreased, and wireless transmission resources can be saved.

DETAILED DESCRIPTION

At present, when one of multiple subscriber identity cards generates a service request, the multi-card user equipment establishes a data transmission channel with a network for the one of multiple subscriber identity cards correspondingly. While multiple subscriber identity cards generate service requests at a same time, the multi-card user equipment establishes a data transmission channel corresponding to each subscriber identity card separately. In other words, in the existing multi-card user equipment that can provide services for multiple subscriber identity cards, there is a one-to-one relationship between the data transmission channel and the subscriber identity card.

Figure 1:
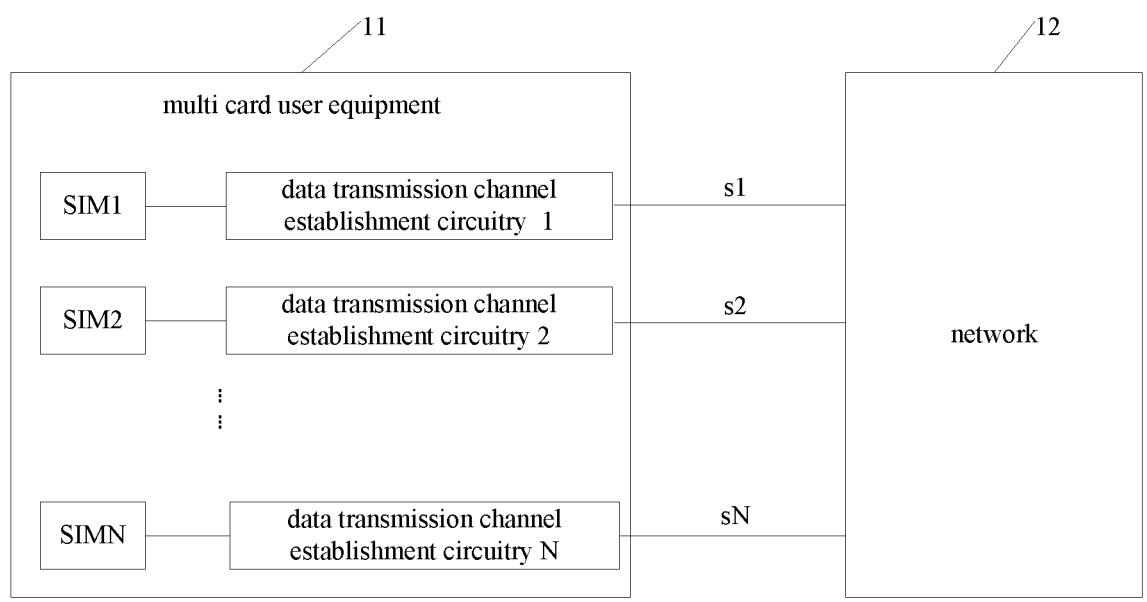
FIG. 1 schematically illustrates a structural diagram of a multi-card user equipment according to an existing technology.

For example, referring to FIG. 1, Multi-subscriber identity card user equipment 11 includes N pieces of subscriber identity cards: SIM1, SIM2, . . . SIMN. Each subscriber identity card corresponds to a data transmission channel establishment circuitry. For example, data transmission channel establishment circuitry 1 is configured to establish a data transmission channel s1 between network 12 and SIM1 for SIM1 when SIM1 generates a service request, data transmission channel establishment circuitry 2 is configured to establish data transmission channel s2 between network 12 and SIM2 for SIM2 when SIM2 generates a service request, . . . , data transmission channel establishment circuitry N is configured to establish data transmission channel sN between network 12 and SIMN for SIMN when SIMN generates a service request.

Referring to FIG. 1, if multi-card user equipment 11 includes multiple subscriber identity cards, it's necessary for the multi-card user equipment 11 to establish N data transmission channels, which results in a high hardware cost and complexity.

A multi-card user equipment service processing method is provided according to an embodiment of the present disclosure. In the method, a data transmission channel corresponding to at least two of the subscriber identity cards share a common wireless connection. Compared to the existing solution of each subscriber identity card corresponding to a different wireless connection, hardware cost and complexity can be decreased, and wireless transmission resources can be saved.

In order to clarify the object, solutions and advantages of embodiments of the present disclosure, embodiments of present disclosure will be described clearly in detail in conjunction with accompanying drawings.

Figure 2:
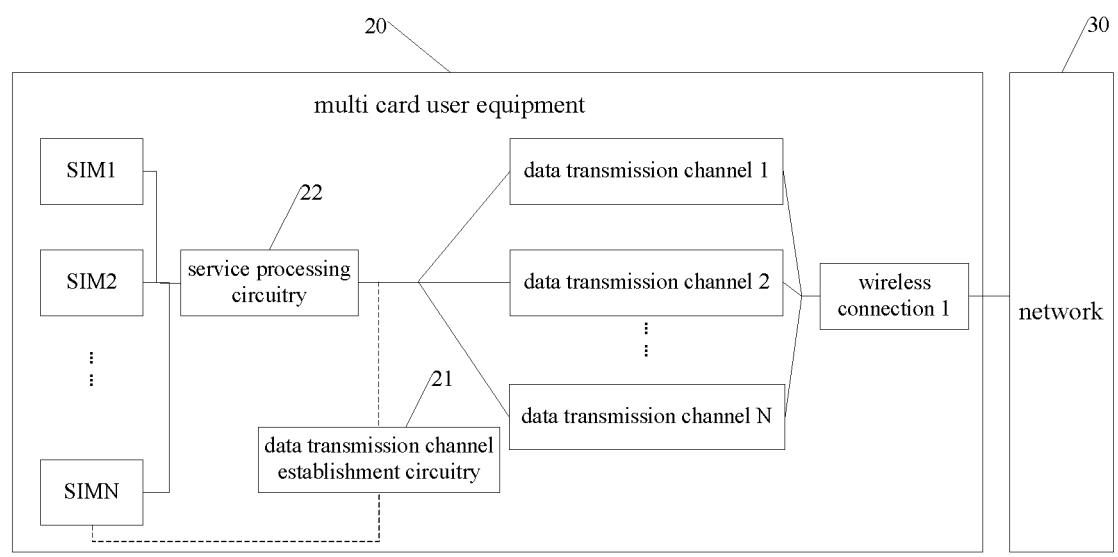
FIG. 2 schematically illustrates a structural diagram of a multi-card user equipment according to an embodiment of the present disclosure.

Referring to FIG. 2, FIG. 2 schematically illustrates a structural diagram of a multi-card user equipment 20. The multi-card user equipment 20 includes: multiple subscriber identity cards SIM1~SIMN including a first subscriber identity card, a data transmission channel establishment circuitry 21, a service processing circuitry 22.

The first subscriber identity card is an user identification card corresponding to a service request, and can be any one of the multiple subscriber identity cards SIM1~SIMN, wherein N is a positive integer. In other words, any user identification card of the multi-card user equipment 20 may be the user identification card corresponding to the service request.

The data transmission channel establishment circuitry 21 is configured to establish a data transmission channel between the user equipment 20 and a network 30.

The service processing circuitry 22 is configured to, when receiving a service request corresponding to the first subscriber identity card, process the service request with a data transmission channel corresponding to the first subscriber identity card between the user equipment 20 and the network 30.

In some embodiments, there may be multiple services corresponding to a service request. For example, the multiple services may include a basic service or a supplementary service. The basic service may be any one of registration service, voice service, video service, short message service or data service. The Complementary service may be services relevant to supplementing or modifying the basic service, for example, calling transfer service. The service request may be initiated based on any subscriber identity card, or by the wireless network.

In some embodiments, the network 30 may be a wireless network implemented for establishing a wireless connection, it may also be a service network implemented for providing service for multi-card user equipment.

In some embodiments, the wireless network may be 5G, 4G, 3G, or General Packet Radio Service (GPRS), which may be realized through public mobile communication network. The wireless network may also be a wireless local area network (Wi-Fi) or the like. Other network is possible, as long as a wireless electromagnetic wave is implemented as a transmission medium. Services based on 4G Long Term Evolution (LTE) network include voice service, video service, short message and the like, wherein the voice service is a VoLTE service. Services based on Wi-Fi network include voice service, video service, short message and the like, wherein the voice service is a VoWiFi service.

In some embodiments, a service network corresponds to a service request. The wireless network and service network varies with the service request, and thus the data transmission channel varies. For example, if the service request is a VoLTE service request or a VoWiFi service request, the service network may be IP Multimedia Subsystem (IMS) network.

In some embodiments, every subscriber identity card in the multi-card user equipment 20 corresponds to a data transmission channel. The data transmission channel includes a data channel and a wireless connection. The data channel corresponds to the subscriber identity cards SIM1~SIMN in the user equipment 20 one by one. For example, referring to FIG. 2 and FIG. 3, data transmission channel 1 corresponds to SIM1, data transmission channel 2 corresponds to SIM2, data transmission channel m corresponds to SIMm, data transmission channel N corresponds to SIMN, wherein m is a positive integer, and m is less than N.

In some embodiments, in all the data transmission channels corresponding to the subscriber identity cards in the user equipment 20, a number of data transmission channels sharing a same wireless connection can be set according to practice. In some situation, a part of the data transmission channels share a same wireless connection, In some other situation, all the data transmission channels share a same wireless connection.

For example, referring to FIG. 2, all the data transmission channels corresponding to all the subscriber identity cards in the multi-card user equipment 20 share a same wireless connection 1. Wireless connection 1 and data channel 1 constitutes a data transmission channel s1, wireless connection 1 and data channel 2 constitutes a data transmission channel s2, . . . , wireless connection 1 and data channel N constitutes a data transmission channel sN.

Figure 3:
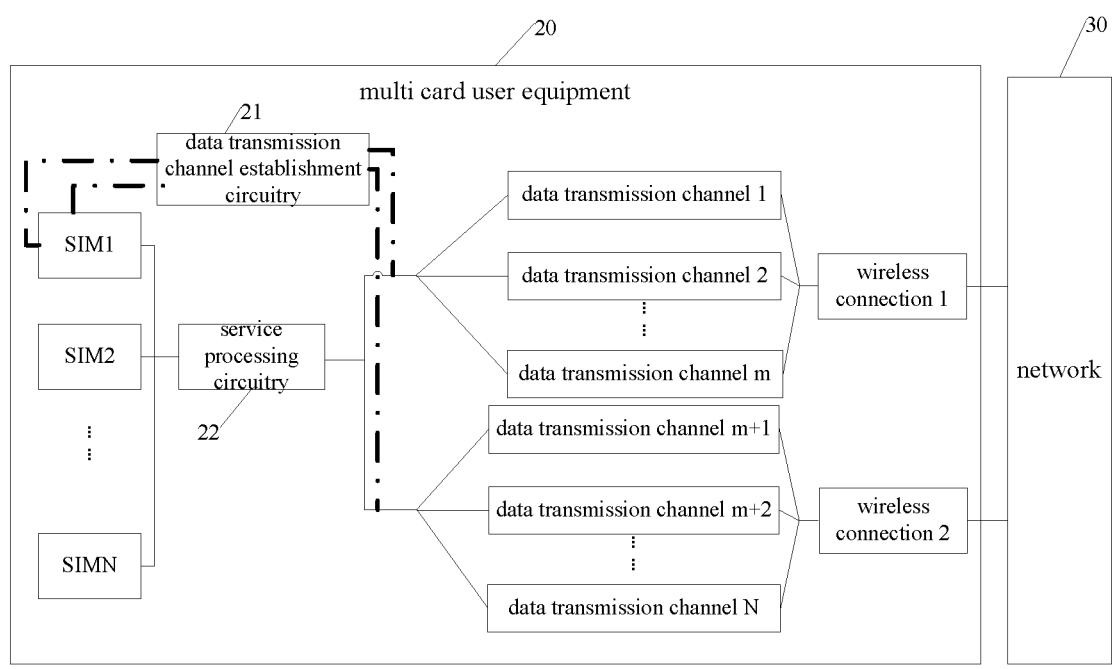
FIG. 3 schematically illustrates a structural diagram of a multi-card user equipment according to an embodiment of the present disclosure.

Referring to FIG. 3, all the data transmission channels corresponding to multiple subscriber identity cards SIM1~SIMm of the multi-card user equipment 20 share a common wireless connection 1, the data transmission channels corresponding to multiple subscriber identity cards SIM (m+1)~SIMN share a common wireless connection 2. Wireless connection 1 and data channel 1 constitutes a data transmission channel s1, wireless connection 1 and data channel 2 constitutes a data transmission channel s2, . . . , wireless connection 1 and data channel m constitutes a data transmission channel sm, wireless connection 2 and data channel m+1 constitutes a data transmission channel s(m+1), wireless connection 2 and data channel m+2 constitutes a data transmission channel s(m+2), wireless connection 2 and data channel N constitutes a data transmission channel sN.

In some embodiments, the data transmission channel establishment circuitry 21 can establish a wireless connection based on any one of the multiple subscriber identity cards SIM1~SIMN. In some situation, the data transmission channel establishment circuitry 21 may establish a wireless connection based on the first subscriber identity card. In some other situation, the data transmission channel establishment circuitry 21 may also establish a wireless connection based on another subscriber identity card other than the first subscriber identity card. In other words, the subscriber identity card based on to establish a wireless connection may be any one of the multiple subscriber identity cards SIM1~SIMN, as long as the subscriber identity card based on to establish any two of the wireless connections is different. For example, referring to FIG. 2, the data transmission channel establishment circuitry 21 may establish wireless connection 1 based on SIMN. Referring to FIG. 3, the data transmission channel establishment circuitry 21 may establish wireless connection 1 based on SIM1, and establish wireless connection 2 based on SIM2.

In some embodiments, through an established wireless connection, it's optional to establish multiple data transmission channels based on a subscriber identity card same as the subscriber identity card establishing the wireless connection. And all subscriber identity cards sharing the common wireless connection may register on the service network through different data transmission channels respectively and establish their own data transmission channel respectively. In other words, the data transmission channel sharing a common wireless connection is established based on a common subscriber identity service access point.

In some embodiments, if all the subscriber identity cards in the multi-card user equipment support a VoLTE system, and the subscriber identity card establishing wireless connection has already registered on a LTE network before establishing a data transmission channel, then the other subscriber identity card may register on a LET network or on a 2G network or on a 3G network.

Referring to FIG. 2, the data transmission channel establishment circuitry 21 may establish N Public Data Network (PDN) data transmission channels with an IMS network implementing a common service access point IMS APN1. In some embodiments, an established data transmission channel can be called IMS PDN, the N data transmission channels can be called IMS PDN1~IMS PDNN. SIM1 may register on an IMS network through IMS PDN1, and establish data transmission channel s1. SIM2 may register on an IMS network based on IMS PDN2, and establish data transmission channel s2, . . . , SIMN may register on an IMS network based on IMS PDNN, and establish data transmission channel sN.

Referring to FIG. 3, the data transmission channel establishment circuitry 21 may establish m data transmission channels IMS PDN1~IMS PDNm based on a service access point IMS APN1 channel. SIM1~SIMm may register on the IMS network through a corresponding data transmission channel respectively, and establish corresponding data transmission channels s1~sm. For example, the data transmission channel establishment circuitry 21 may establish N-m data transmission channels based on SIM2 implementing a service access point IMS APN2. And SIM (m+1)~SIMN register on an IMS network through corresponding data transmission channel and establish corresponding data transmission channel s(m+1)~sN.

In some embodiments, if all the subscriber identity cards in the multi-card user equipment 20 support a VoWiFi system, and the subscriber identity card establishing wireless connection has already registered on a Wi-Fi network before establishing a data transmission channel, the other subscriber identity card may register on a Wi-Fi network or a 2G network or a 3G network or a 4G network or a 5G network. And furthermore, establishing a data transmission channel for a VoWiFi service request may be referred to the process which is illustrated above about how to establish the data transmission channel for the VoLTE service request from SIM1, therefore detailed processes is not described hereinafter.

After establishing a data transmission channel and receiving a service request corresponding to the first subscriber identity card, a data transmission channel between the user equipment and the network corresponding to the first subscriber identity card is implemented to process the service request. For example, a VoLTE service data from the first subscriber identity card is sent to a base station by a wireless connection between the LTE network and the base station, and then the base station sends the VoLTE service data to an IMS network via a data transmission channel IMS PDN. The VoLTE service data from the IMS network is sent to the base station of the LTE network via the data transmission channel IMS PDN, and then is sent to the first subscriber identity card by the base station.

It should be noted that, in some embodiments, the wireless resource the multi-card user equipment implemented to transmit data varies with different service request. For example, when a service request is a voice service request, the wireless resource implemented may be a dedicated voice bearer. And if the service request is a video service request, the wireless resource implemented may include both a dedicated voice bearer, and a dedicated video bearer. The dedicated voice bearer, and the dedicated video bearer can be accomplished by re-matching a common RRC connection.

It should be noted that in some embodiments, when receiving the service request corresponding to the first subscriber identity card, the multi-card user equipment may be in an idle state, which means it's not processing any service at that moment, or in a service processing state, which means it's processing a service corresponding to the other subscriber identity card. In other words, the multi-card user equipment in this embodiment can process services corresponding to different subscriber identity cards simultaneously. It is understandable that the invention disclosure can work no matter whether the multi-card user equipment is processing service or not currently, and it should be within the protection scope of this invention.

In some embodiments, the multi-card user equipment refers to a computer implemented in user equipments, including but not limited to mobile phones, laptops, tablets and on-board computer and the like. And the number of the subscriber identity card can be various, and the multi-card user equipment can not only support physical subscriber identity card, but also support non-physical subscriber identity card. For example, the multi-card user equipment can include a virtual subscriber identity card and a physical subscriber identity card. The multi-card user equipment can also include two more virtual subscriber identity cards and two more physical subscriber identity cards. A service based on any subscriber identity card of the multi-card user equipment can be processed implementing the method in this embodiment.

It should be noted that in some embodiments, the subscriber identity card may include a subscriber identity card with different kind of specifications and standards, other subscriber identity card is possible, as long as an user can be identified according to the information in the subscriber identity card. For example, from the aspect of an available network mode, the subscriber identity card can be a normal subscriber identity card, the subscriber identity card can also be an USIM card or even an eSIM card. From the aspect of the size of a card, the subscriber identity card can be a standard subscriber identity card whose size is 25 mm×15 mm, or a mini subscriber identity card whose size is 12 mm×15 mm.

From above, by setting data transmission channels corresponding to at least two of the subscriber identity cards share a common wireless connection, compared with the solution of multiple subscriber identity cards corresponding to different wireless connection, hardware cost and complexity can be decreased, and wireless transmission resources can be saved.

In order to make those skilled in the art better understand and implement this disclosure, detailed description about the process of service processing method is clearly illustrated below and accompanied figures.

Figure 4:
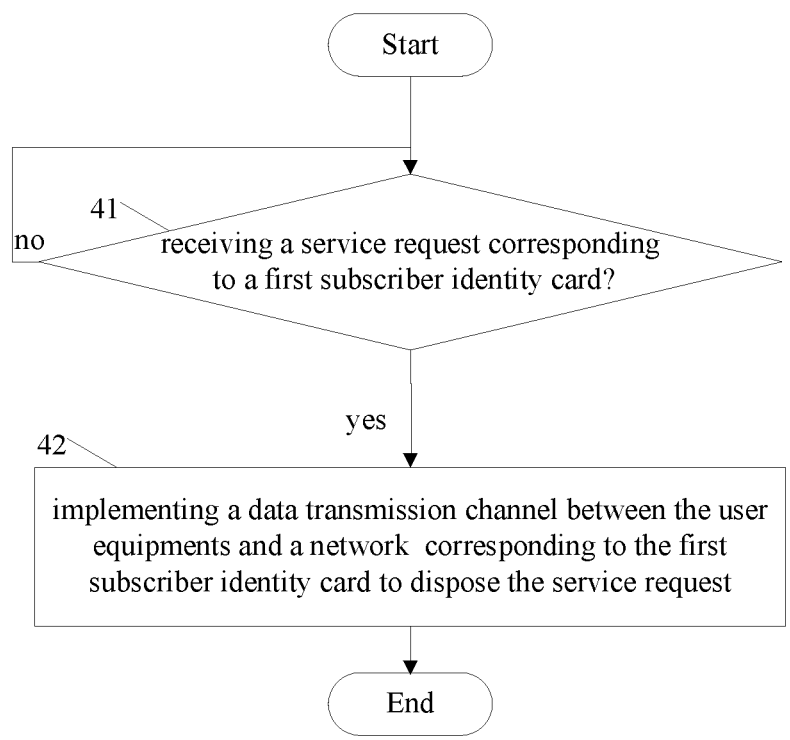
FIG. 4 schematically illustrates a flow chart of a multi-card user equipment service processing method according to an embodiment of the present disclosure.

FIG. 4 schematically illustrates a flow chart of a method for processing service of multi-card user equipment according to an embodiment. Referring to FIG. 4:

Step 41: determine whether receiving a service request corresponding to a first subscriber identity card.

In some embodiment, there may be multiple services corresponding to a service request. For example, the multiple services may include a basic service or a supplementary service. The basic service may be any one of registration service, voice service, video service, short message service or data service. The supplementary service may be services relevant to supplementing or modifying the basic service, for example, calling transfer service. The service request may be initiated based on any subscriber identity card, or by the wireless network.

In some embodiments, the service request may be initiated based on the first subscriber identity card, or by the network.

When a service request received is determined corresponding to a first subscriber identity card, go to Step 42, otherwise go to Step 41.

Step 42: implementing a data transmission channel between the user equipment and a network corresponding to the first subscriber identity card to process the service request.

In some embodiment, wherein the data transmission channel includes a data channel and a wireless connection, the data channel corresponds to multiple subscriber identity cards included in the user equipment one by one, a data transmission channel corresponding to at least two of the subscriber identity cards share a common wireless connection.

In some embodiment, in all the data transmission channels corresponding to the subscriber identity cards in the user equipment, a number of data transmission channels sharing a same wireless connection can be set according to practice. In some situation, a part of the data transmission channels share a same wireless connection, In some other situation, all the data transmission channels share a same wireless connection.

In some embodiments, through an established wireless connection, it's possible to establish multiple data transmission channels based on a subscriber identity card same as the subscriber identity card establishing the wireless connection. And all subscriber identity cards sharing a common wireless connection may register on the service network through different data transmission channels respectively and establish their own data transmission channel respectively. In other words, the data transmission channel sharing a common wireless connection is established based on a common subscriber identity service access point.

In some embodiments, if the service request is a VoLTE service request, the subscriber identity card establishing a data transmission channel between the first subscriber identity card and the network is a subscriber identity card registered in LTE network.

In some embodiments, if the service request is a VoWiFi service request, the subscriber identity card establishing a data transmission channel between the first subscriber identity card and the network is a subscriber identity card registered in Wi-Fi network.

The service processing method implemented can be referred to the description about the multi-card user equipment 20 above, and detailed description is not provided hereinafter.

Those skilled in the art can understand that all of or a portion of the processes in this method provided in the above embodiments can be implemented by related hardware with instruction of computer program. The computer program may be saved in a readable storage medium, and include the processes of the method provided in the above embodiments when it is executed. The readable storage medium may be a magnetic disk, an optical disk, a Read-Only Memory (ROM) or a Random Access Memory (RAM).

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A service processing method for a multi-card user equipment, comprising:
   when receiving a service request corresponding to a first subscriber identity card in the user equipment, implementing a first data transmission channel between the user equipment and a network corresponding to the first subscriber identity card to process the service request;
   wherein a plurality of data channels correspond to a plurality of subscriber identity cards in the user equipment respectively, each of data transmission channels comprises one of the plurality of data channels and a wireless connection, the data transmission channels corresponding to at least two of the plurality of subscriber identity cards share a same wireless connection, and the same wireless connection is capable of being used by the at least two of the plurality of subscriber identity cards simultaneously.

2. The method according to claim 1, wherein all the data transmission channels corresponding to the plurality of subscriber identity cards share the same wireless connection.

3. The method according to claim 2, wherein the data transmission channels sharing the same wireless connection are established based on a common subscriber identity service access point.

4. The method according to claim 3, wherein the service comprises a basic service and a supplementary service; the basic service comprises any one of registration service, voice service, video service, short message service or data service; and the supplementary service comprises service which is obtained by supplementing or modifying the basic service.

5. The method according to claim 4, wherein the subscriber identity card establishing the first data transmission channel between the first subscriber identity card and the network is a subscriber identity card registered in an LTE network, when the service request is a VoLTE service request.

6. The method according to claim 4, wherein the subscriber identity card establishing the first data transmission channel between the first subscriber identity card and the network is a subscriber identity card registered in a Wi-Fi network, when the service request is a VoWiFi service request.

7. The method according to claim 3, wherein the service request is initiated by the first subscriber identity card or by the network.

8. The method according to claim 3, wherein the multi-card user equipment is in an idle state or a service processing state, when receiving the service request corresponding to the first subscriber identity card.

9. A multi-card user equipment, comprising:
   a plurality of subscriber identity cards comprising a first subscriber identity card;
   a data transmission channel establishment circuitry; and
   a service processing circuitry,
   wherein the data transmission channel establishment circuitry is configured to:
      establish data transmission channels between the user equipment and a network, wherein each of the data transmission channels comprises a data channel and a wireless connection, the data channels of the data transmission channels correspond to the plurality of subscriber identity cards respectively, the data transmission channels corresponding to at least two of the plurality of subscriber identity cards share a same wireless connection, and the same wireless connection is capable of being used by the at least two of the plurality of subscriber identity cards simultaneously; and
   wherein the service processing circuitry is configured to:
      when receiving a service request corresponding to the first subscriber identity card, implement the data transmission channel between the user equipment and the network corresponding to the first subscriber identity card to process the service request.

10. The multi-card user equipment according to claim 9, wherein all the data transmission channels corresponding to the plurality of subscriber identity cards share the same wireless connection.

11. The multi-card user equipment according to claim 10, wherein the data transmission channels sharing the same wireless connection are established based on a common subscriber identity service access point.

12. The multi-card user equipment according to claim 11, wherein the service comprises: a basic service and a supplementary service the basic service comprises any one of registration service, voice service, video service, short message service or data service; the supplementary service comprises service which is obtained by supplementing or modifying the basic service.

13. The multi-card user equipment according to claim 12, wherein when the service request is a VoLTE service request, the subscriber identity card establishing the data transmission channel between the first subscriber identity card and the network is a subscriber identity card registered in an LTE network.

14. The multi-card user equipment according to claim 12, wherein when the service request is a VoWiFi service request, the subscriber identity card establishing the data transmission channel between the first subscriber identity card and the network is a subscriber identity card registered in a Wi-Fi network.

15. The multi-card user equipment according to claim 11, wherein the service request is initiated by the first subscriber identity card or by the network.

16. The multi-card user equipment according to claim 11, wherein when receiving the service request corresponding to the first subscriber identity card, the multi-card user equipment is in an idle state or service processing state.

* * * * *